Figure 1:
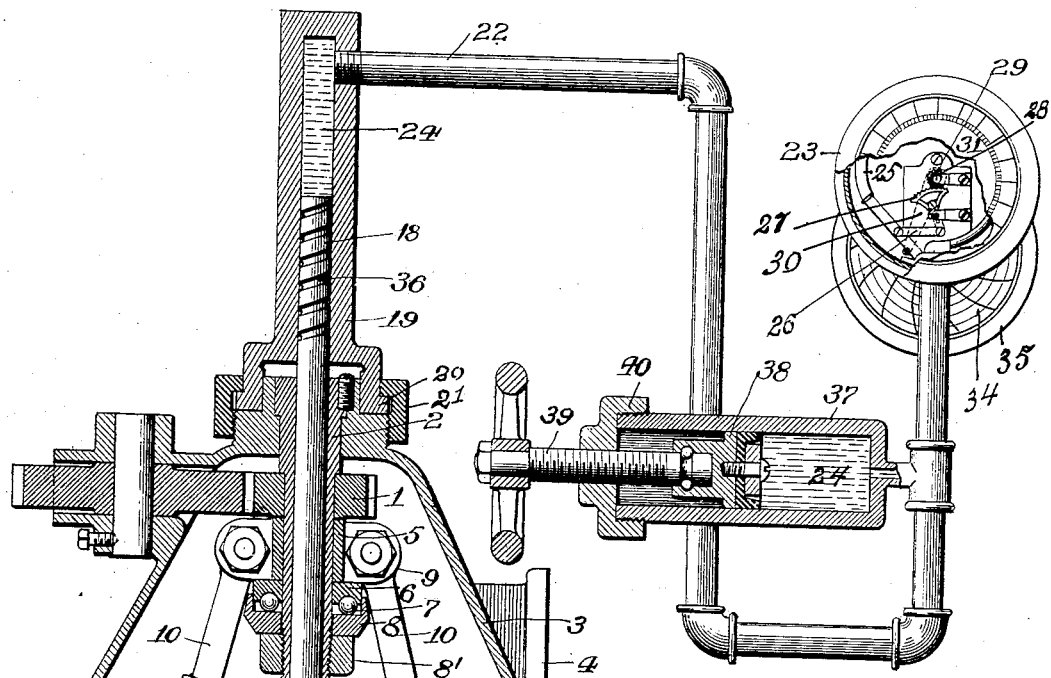

No. 762,201. PATENTED JUNE 7, 1904.
C. SCHENCK, Jr.
SPEED INDICATOR AND RECORDER.
APPLICATION FILED DEC. 2, 1901. RENEWED MAR. 16, 1904.
NO MODEL.

Witnesses:
Harold G. Barrett
Edward T. Wray

Inventor:
Charles Schenck, Jr.
By L.B. Hopkins
Atty.

No. 762,201.

Patented June 7, 1904.

UNITED STATES PATENT OFFICE.

CHARLES SCHENCK, JR., OF CHICAGO, ILLINOIS, ASSIGNOR OF ONE-HALF TO CHARLES W. WEISZ, OF CHICAGO, ILLINOIS.

SPEED INDICATOR AND RECORDER.

SPECIFICATION forming part of Letters Patent No. 762,201, dated June 7, 1904.

Application filed December 2, 1901. Renewed March 16, 1904. Serial No. 198,486. (No model.)

*To all whom it may concern:*

Be it known that I, CHARLES SCHENCK, Jr., a citizen of the United States, residing at Chicago, in the county of Cook, State of Illinois, have invented certain new and useful Improvements in Speed Indicators and Recorders, of which the following is a specification.

The present invention relates to a device adapted to be coupled or geared by some suitable means with a moving part, such as a revolving shaft or wheel, for the purpose of indicating or recording, or both indicating and recording, the speed of said moving part or the speed of a vehicle or vessel carrying it or by which it is carried. Such devices are not broadly new, and among the conditions they have heretofore been used to indicate may be mentioned the revolutions of stationary engines and motors, the speed of moving vehicles of all descriptions, including velocipedes, automobiles, of railway-trains, and the speed of vessels. Such devices usually include a weight acted upon by centrifugal force, an indicator of some sort, and means for transmitting movement from the weight to the indicator.

According to the present invention the movement of the centrifugal weight or the force produced by its centrifugal action is transmitted, through the medium of a liquid contained in a suitable tube, to a gage, which is provided with means for indicating or recording, or both indicating and recording, the speed, according to its equipment The term "gage" is herein used to mean any instrument having a part adapted to respond to the pressure of liquid upon it, so that it will be moved or permitted to move by variations in said pressure, and means for transmitting the movement of said part to a shaft. If this shaft actuates a pointer adapted to sweep a calibrated dial or the like, the instrument may be appropriately termed an "indicator," and if it actuates a stylus arranged in contact with a disk or the like adapted to receive a record and driven by clockwork the instrument may appropriately be termed a "recorder," although in this latter arrangement it will also indicate the speed at the instant of inspection. I desire to have it understood, therefore, that the invention in its broadest aspect comprehends either an indicator or a recorder, and in a more limited aspect it comprehends a gage equipped for both indicating and recording.

I prefer to use the well-known Bourdon steam-gage, since without any modification in its construction it may be used as an indicator, and in order to add the recording feature it is simply necessary to extend its shaft and add to said extension an arm carrying a stylus arranged in operative relation to the disk of a recorder of ordinary construction.

I prefer to use oil for transmitting the movement and pressure from the centrifugal weight to the gage; but mercury, alcohol, or any other liquid may be used. As the liquid is subject to expansion and contraction under variations in temperature, I provide means for setting the gage so that its arm will stand at zero when the centrifugal weight is at rest. This may be done by manually increasing or decreasing the pressure upon the liquid as may be necessary, and for this purpose I prefer to use a cylinder or chamber in open communication with the liquid-tube, a plunger in said cylinder or chamber, and a hand-screw for actuating said plunger.

For transmitting the movement or pressure from the centrifugal weight to the liquid I prefer to use a piston suitably connected with the weight and fitting in a cylinder with which the oil-tube communicates, and in order to prevent the oil from escaping past the piston the latter is caused to rotate and is provided in its face with a spiral groove that will tend to feed the oil toward the inner end and into the cylinder.

Figure 2:
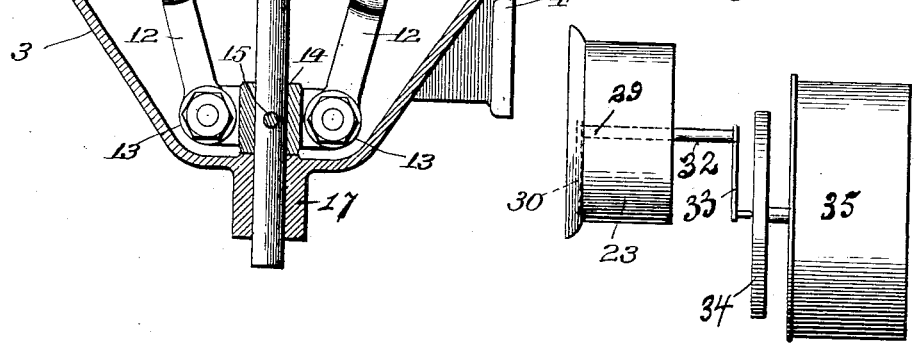

In the accompanying drawings, which are made a part of this specification, Figure 1 is a sectional elevation of a speed indicator and recorder embodying my invention. Fig. 2 is a detail of the gage.

The invention is not concerned with the means for connecting the device with the shaft, wheel, or other part from which the motion for operating it is derived, and hence it may be assumed that the gear-wheel 1 derives its motion from said part through any suitable means. The wheel 1 is mounted to revolve about a sleeve 2, which is supported by the upper half of a casing 3, which is formed in two parts, each approximating in shape a truncated cone. These cones come together at their bases, and each is provided with a bracket 4 for attaching it to its support.

The gear-wheel 1 is formed with or non-rotatively connected to a ring 5, which also is mounted to revolve about the sleeve 2 and is in turn formed with or non-rotatively connected to a ring 6, having a race for a series of balls 7 and forming one of the members of a ball-bearing, the other member 8 of which is supported by a nut 8', turned onto the sleeve 2.

The ring 5 has at diametrically opposite points ears 9, to which are jointed links 10, each of which carries a weight 11, and to each of these weights is jointed one end of a link 12, the other ends of the links 12 being jointed to perforated ears 13, carried by a collar 14. This collar is non-rotatively connected, by means of a pin 15 or otherwise, to a shaft 16, which is capable of both rotary and endwise movement. The lower portion of the shaft fits in a bearing 17 at the bottom of the casing 3, and above this it has a long bearing in the sleeve 2. Its upper part constitutes a piston 18, which fits in a cylinder 19, supported by and secured to the casing. To this end the cylinder is provided with a radial flange 20, which is engaged by the inwardly-presented flange of a coupling-ring 21, which has threaded engagement with the casing, so that the joint may be made liquid-tight.

The movement of the free end of the tubular chamber is due to the fact that the chamber being completely closed excepting as aforesaid the increasing pressure within it tends to and does, in fact, distend its walls, and the movement thus produced manifests itself in a tendency of the tube to straighten out or assume a shape of less curvature. This action is possible only with a chamber which is closed as against the pressure of the liquid within it and which is not only extensible, or, in other words, capable of increasing in internal capacity under the influence of a fluid within it, but which is also elastic or capable of resuming its normal condition upon the removal of the pressure that caused it to vary therefrom. With the chamber, as well as the communicating-tube, completely filled with a practically non-compressible liquid the movement of the liquid at any point, even at the point where the pressure is initially exerted upon it, will be very slight indeed, and this is an advantage which manifests itself in limiting the necessary movement of all of the parts that are subject to wear. This advantage is available only where the entire system of passages containing the liquid is closed and where the construction of the gage-chamber is such that it will offer a considerable resistance to the movement of the liquid. In the construction above described the resistance of the tubular chamber to flexure is relied upon to resist the movement of the liquid.

Communicating with the cylinder 19 is a tube 22, which may extend to any desired point, however distant, and there communicates with a gage 23, the cylinder 19, the tube 22, and the chamber of the gage being filled with liquid 24. In the drawings I have shown a Bourdon steam-gage which has a liquid-chamber in the form of a curved tube 25, which is completely closed excepting that one end of it is in open communication with the tube 22. Its other end is connected, through the medium of a link 26, with a toothed segment 27, which meshes with a pinion 28, carried by the arbor 29 of the arm or pointer 30. The gage has a dial 31, which may be calibrated to show the number of revolutions per minute, miles or other distances per hour or minute, or otherwise to meet the requirements.

With a device constructed as above described the revolution of the gear-wheel 1 (the speed of which will be exactly proportional to the speed of the part from which it derives its motion) will impart corresponding revolution to the centrifugal weights 11, and depending upon the speed they will be moved outward by centrifugal force a greater or less distance and with a greater or less force. The sleeve 2, by which they are indirectly supported, being incapable of movement, their tendency will be to move the shaft 16 endwise and cause the piston to enter the cylinder 19 and exert pressure upon the liquid 24. This pressure being transmitted to the liquid within the gage will move the arm or pointer a greater or less distance, depending upon the pressure, and the graduations of the dial will give the desired information at a glance.

As shown in the drawings, the arbor 29 is extended through the casing of the instrument 23, and its extension 32 carries an arm 33, which in turn carries a stylus having contact with a record-disk 34, which is driven by a chronometer or clockwork 35, the disk 34 being of the type customarily used in recorders of various kinds and marked to show hours and speed or the like. The record-disk is so located with respect to the shaft of the indicator that the stylus will move in an arc toward and from the center of the disk.

For the purpose of packing the piston and preventing the liquid from escaping past it it is provided with a spiral groove 36, which as the piston revolves has a constant tendency to feed the liquid to the end of the piston and into the cylinder.

Communicating with some part of the device which contains the liquid, preferably with the tube 22, is a cylinder 37, containing a plunger 38, carried by a hand-screw 39, working through a threaded opening in the cap 40 of the cylinder. By this means a greater or less pressure may be exerted upon the liquid 24 for setting the gage at zero while the centrifugal weight is at rest.

Having thus described my invention, the following is what I claim as new therein and desire to secure by Letters Patent:

1. In a device of the class described, the combination with a gage having a part adapted to respond to variations in the pressure of a liquid upon it and to resist said pressure, of a tube communicating with the gage, a cylinder with which the tube communicates, liquid filling the tube and cylinder and adapted to exert pressure upon said part, a piston fitting the cylinder liquid-tight, and means operated by movement derived from a part whose speed is to be ascertained for both revolving the piston and moving it endwise, the piston being provided in its face with a spiral groove and the passages containing the liquid being closed, substantially as described.

2. In a device of the class described, the combination with a gage having a part adapted to respond to variations in the pressure of a liquid upon it and to resist said pressure, of a tube communicating with the gage, a cylinder with which the tube communicates, a liquid filling the tube and cylinder and adapted to exert pressure upon said part, a piston fitting the cylinder liquid-tight, a shaft carrying the piston, a centrifugal weight, means connecting the weight with the shaft whereby the shaft is moved endwise as the weight moves toward and from its center of rotation, and a rotary part carrying the weight and operated by movement derived from the part whose speed is to be ascertained, the passages containing the liquid being closed, substantially as described.

3. In a device of the class described, the combination with a gage having a part adapted to respond to variations in the pressure of a liquid upon it and to resist said pressure, of a tube communicating with the gage, liquid filling the tube and adapted to exert pressure upon said part, a shaft movable endwise, means operated by the endwise movement of the shaft for exerting pressure upon the liquid, a centrifugal weight, means connecting it with the shaft whereby the shaft is moved endwise as the weight moves toward and from its center of rotation, and means operated by movement derived from the part whose speed is to be ascertained for revolving the shaft, the passages containing the liquid being closed, substantially as described.

4. In a device of the class described, the combination with a gage having a part adapted to respond to variations in the pressure of a liquid upon it and to resist said pressure, of a tube communicating with the gage, a cylinder with which the tube communicates, liquid filling the tube and cylinder and adapted to exert pressure upon said part, a piston fitting the cylinder liquid-tight, a shaft carrying the piston, a bearing-sleeve surrounding the shaft, a ring surrounded and supported by the bearing-sleeve, means operated by movement derived from the part whose speed is to be ascertained for turning the ring upon the bearing-sleeve, a centrifugal weight carried by the ring, and means for transmitting movement from the weight to the shaft, the passages containing the liquid being closed, substantially as described.

5. In a device of the class described, the combination of a gage, a tube communicating therewith, liquid filling the tube, means operated by movement derived from the part whose speed is to be ascertained for exerting pressure upon said liquid, and a device adapted to be operated manually for increasing or descreasing the pressure of the liquid for setting the gage, substantially as described.

6. In a device of the class described, the combination of a gage, a tube communicating therewith, liquid filling the tube, means operated by movement derived from the part whose speed is to be ascertained for exerting pressure upon said liquid, a cylinder communicating with the tube aforesaid, a follower in said cylinder and a hand-screw carrying the follower, substantially as described.

7. In a device of the class described, the combination with a gage, having a part adapted to respond to variations in the pressure of a liquid upon it, a shaft, means for transmitting movement from said part to said shaft, a pointer carried by said shaft, and a calibrated dial, of an arm also carried by said shaft, a stylus carried by said arm, a record-disk with which said stylus has contact, and clockwork for revolving the disk, the disk being so located with respect to the shaft that the stylus moves in an arc toward and from the center of the disk, substantially as described.

CHARLES SCHENCK, JR.

Witnesses:
 CHARLES W. WEISZ,
 L. M. HOPKINS.